UNITED STATES PATENT OFFICE.

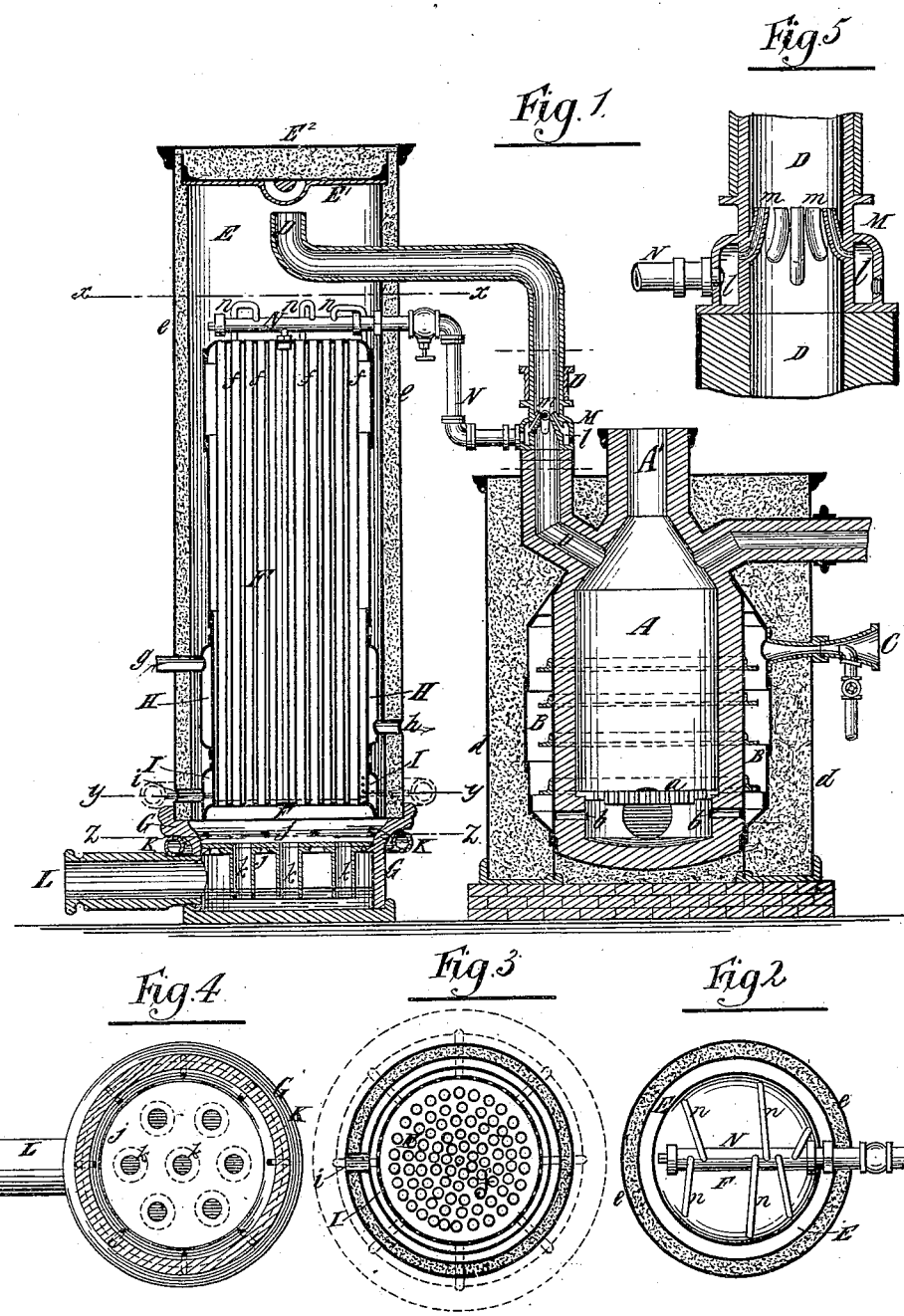

PHILIP W. MACKENZIE, OF BLAUVELTVILLE, ASSIGNOR TO THE MACKENZIE & SAYRE MANUFACTURING COMPANY, OF NEW YORK, N. Y.

PROCESS OF MAKING ILLUMINATING-GAS.

SPECIFICATION forming part of Letters Patent No. 246,963, dated September 13, 1881.

Application filed September 17, 1880. (No model.)

*To all whom it may concern:*

Be it known that I, PHILIP W. MACKENZIE, of Blauveltville, in the county of Rockland and State of New York, have invented a certain new and useful Improvement in the Process of Making Illuminating-Gas, of which the following is a specification.

My invention relates to the production of gas suitable for illumination or other purposes by first generating in a suitable generator or furnace a lean gas—such as a mixture of hydrogen and carbonic oxide—and afterward enriching or perfecting such gas by the addition thereto, while it is at a high temperature, of vapors or gases which are obtained from hydrocarbon liquids.

The principal object of this invention is to dispense with separate retorts and furnaces therefor for fixing or perfecting the enriched gas, and thereby to effect an economy not only in the process but in the cost of the apparatus employed for performing it; and to this end my improvement consists in the production of a rich gas suitable for illumination by first generating a lean gas, consisting of a mixture of carbonic oxide and hydrogen, by the combustion of coal or other matter containing carbon with air or oxygen and steam, afterward enriching and perfecting said gas by combining therewith, in a highly-heated state, a gas obtained by the distillation of a liquid hydrocarbon, and, finally, employing the heat of the so enriched and perfected gas to effect the distillation of the liquid hydrocarbon and to heat the vapors of such distillation to a sufficiently-high degree to effect their conversion into permanent gas.

My improvement might be carried out by various forms of apparatus; but I have represented in the accompanying drawings an apparatus which may be very advantageously used.

In the drawings, Figure 1 represents a central vertical section of such apparatus, comprising a generator for generating the lean gas and an evaporator and converter in which the hydrocarbon liquid is vaporized and its vapors are heated to a high degree. Fig. 2 represents a horizontal section of the evaporator and converter upon the dotted line $x x$, Fig. 1. Fig. 3 represents a similar view thereof upon the dotted line $y y$, Fig. 1. Fig. 4 represents a similar section upon the line $z z$, Fig. 1; and Fig. 5 represents a central section upon a larger scale of a mixing-chamber in which the heating of the hydrocarbon vapors is completed and their conversion into permanent gas and their combination with the lean gas are effected.

Similar letters of reference designate corresponding parts in all the figures.

A designates a furnace or generator, provided with a grate, $a$, and filling-mouth $A'$ for the introduction of fuel.

The furnace or generator is constructed with a jacket, B, to which steam and air or oxygen are supplied by an injector, C, and which communicates with the furnace below the grate with ports or tuyeres $b$. Steam and air or oxygen delivered to the jacket by the injector are heated by radiation from the furnace or generator and pass through the ports or tuyeres $b$, and up through the grate, the oxygen serving to support combustion and produce carbonic oxide, while the steam is decomposed and hydrogen liberated, which unites with the carbonic oxide and produces a lean gas. The generator is surrounded by an outer shell or casing, $d$, which retains a covering of non-conducting material around the generator and prevents loss of heat by radiation. From the furnace or generator the lean gas passes by a pipe, D, to a chamber, E, above an evaporator or converter, F, arranged therein. Outside the chamber E is a surrounding casing, $e$, and interposed non-conducting material, and the chamber is closed at the top by a cup-shaped cover, $E'$, filled with non-conducting material and a seal-plate, $E^2$. The evaporator and converter is supported upon a hollow base, G.

The evaporator and converter consists of a metallic shell and a series of tubes passing through it from end to end. The evaporator and converter is somewhat smaller in diameter than the chamber E, and an annular space is thus formed between the two, down which the gas may pass, as well as through the tubes $f$. The evaporator and converter is constructed with two jackets, H I, surrounding it. The jacket H is provided with suitable inlet and outlet pipes, g h, for steam or heated air, for the purpose of heating the hydrocarbon liquid in the evaporator and converter when it is first put in operation. The jacket I is for the introduction of the hydrocarbon liquid, it being provided with a suitable inlet-pipe, i. The shell of the generator opposite this jacket is perforated, as shown clearly in Fig. 3, and by this means the hydrocarbon liquid is evenly distributed around the entire circumference of and over the bottom of the evaporator and converter in quantities as desired.

The base G is divided by a partition-plate, j; and K designates a pipe surrounding the base, and having a number of branches or jets for showering water above said plate and washing the gas. The base below the plate j contains water, as shown in Fig. 1, and from said plate a number of pipes, k, open downward below the level of the water. After being thus washed the gas passes out through the hydraulic main L for further treatment.

M designates a mixing-chamber or device situated in the pipe D, and having a central passage for the escape through it of gas from the furnace, and an annular jacket or chamber, l, from which a number of conduits or passages, m, lead into the central gas-passage, as shown in Fig. 5.

N designates a pipe communicating with the jacket or annular chamber l, and provided within the evaporator and converter with branches n, the arrangement of which is shown clearly in Fig. 2.

To set this apparatus in operation, steam or hot air is introduced into the jacket H to heat the converter for starting the vaporization of the hydrocarbon liquid, and the fire is started in the generator. The ash-pit door is then closed and a mixture of highly-heated carbonic oxide and hydrogen is produced in the generator. In the meantime the hydrocarbon vapors and such gas as may have been produced from such vapors in the converter by the heat of the steam or hot air introduced into the jacket H pass through the pipe N to the annular chamber l of the device M, and through the conduits m enter the pipe D, where they meet and mix with and enrich the intensely-hot lean gas consisting of carbonic oxide and hydrogen, which is just leaving the furnace or generator A by the said pipe. The enriched gas now passing by the pipe D into the chamber E and through the evaporator or converter F serves to heat the latter. The steam or hot air may now be shut off from the jacket H, as the heat of the enriched gas passing through the converter will be sufficient to continue the distillation therein and to heat the product of such distillation to such a degree that it will be wholly or partly converted into permanent gas, and that as it meets the still hotter lean gas in the pipe D it will combine at once therewith and produce a fixed gas of high illuminating power, which, after passing through the converter and out by the pipe L, only requires to be purified by passing through the ordinary or suitable purifiers to render it fit for use.

By my invention it will be understood that while the hydrocarbon is vaporized, and has its vapors heated to a degree to be readily converted into permanent gas by what has heretofore been waste heat, the enriched gas which furnishes such heat is so cooled in its passage through the evaporator or converter that the amount of water required to further cool it is greatly reduced.

The apparatus herein described is not claimed as a part of this invention, but is intended to form the subject-matter of a separate patent.

This invention is not limited to the use of coal or solid matter for the production of the lean gas, as such gas may be obtained by the combustion of hydrocarbon liquids, vapors, or gases with steam and oxygen or air.

What I claim as my invention, and desire to secure by Letters Patent, is—

The improvement in the art or process of making illuminating-gas, consisting in first generating a lean gas, consisting of a mixture of hydrogen and carbonic oxide, by the combustion of coal or other matter containing carbon with air or oxygen and steam, afterward enriching and perfecting the said gas by combining therewith, in a highly-heated state, a gas obtained by the distillation of a hydrocarbon liquid, and, finally, employing the heat of the so enriched and perfected gas to effect the distillation of the liquid hydrocarbon and to heat the vapors of such distillation to a sufficiently high degree to effect their conversion into permanent gas, which is to some extent cooled by the abstraction of the heat in the said distillation, substantially as herein described.

P. W. MACKENZIE.

Witnesses:
HENRY T. BROWN,
T. J. KEANE.